(12) United States Patent
Hayashi et al.

(10) Patent No.: US 7,068,433 B2
(45) Date of Patent: Jun. 27, 2006

(54) FOCUSING SCREEN MASTER AND MANUFACTURING METHOD THEREOF

(75) Inventors: Hidetaka Hayashi, Tatsuno-machi (JP); Satoshi Fujimori, Okaya (JP)

(73) Assignee: Olympus Corporation, Tokyo (JP)

( * ) Notice: Subject to any disclaimer, the term of this patent is extended or adjusted under 35 U.S.C. 154(b) by 51 days.

(21) Appl. No.: 10/988,605

(22) Filed: Nov. 16, 2004

(65) Prior Publication Data

US 2005/0105188 A1   May 19, 2005

(30) Foreign Application Priority Data

Nov. 17, 2003   (JP) ............................. 2003-386135

(51) Int. Cl.
*G02B 27/10* (2006.01)
*G02B 5/18* (2006.01)
*G03B 21/56* (2006.01)
*G03C 5/00* (2006.01)
*B29D 11/00* (2006.01)

(52) U.S. Cl. ...................... 359/619; 359/626; 359/449; 359/569; 430/312; 430/319; 430/321; 430/323; 430/394; 264/1.7; 264/1.38; 427/162; 427/585

(58) Field of Classification Search ................ 359/619, 359/626, 624, 449, 457, 569, 566, 742; 430/312, 430/319, 321–323, 325, 290, 394, 396; 264/1.7, 264/1.38, 2.4, 2.5; 427/162, 163.2, 256, 427/585; 428/29, 30, 167
See application file for complete search history.

(56) References Cited

U.S. PATENT DOCUMENTS

| 4,418,986 | A | * | 12/1983 | Yata et al. ................... 359/456 |
| 4,427,265 | A | | 1/1984 | Suzuki et al. |
| 4,468,092 | A | * | 8/1984 | Inoue et al. ................. 359/457 |
| 4,548,469 | A | * | 10/1985 | Inoue et al. ................. 359/457 |
| 5,380,558 | A | * | 1/1995 | Fujino ...................... 427/255.5 |
| 5,536,455 | A | * | 7/1996 | Aoyama et al. ............. 264/1.7 |
| 5,694,246 | A | * | 12/1997 | Aoyama et al. ............ 359/619 |
| 5,707,684 | A | * | 1/1998 | Hayes et al. ................ 427/162 |
| 5,965,327 | A | | 10/1999 | Kuboya et al. |
| 6,055,107 | A | | 4/2000 | Li et al. |
| 6,381,071 | B1 | * | 4/2002 | Dona et al. ................. 359/621 |
| 6,515,800 | B1 | * | 2/2003 | Border et al. .............. 359/619 |
| 6,558,878 | B1 | * | 5/2003 | Park et al. ................... 430/321 |
| 6,859,326 | B1 | * | 2/2005 | Sales .......................... 359/619 |
| 2002/0034710 | A1 | | 3/2002 | Morris et al. |

FOREIGN PATENT DOCUMENTS

JP   6-194502   7/1994

* cited by examiner

*Primary Examiner*—Loha Ben
(74) *Attorney, Agent, or Firm*—Westerman, Hattori, Daniels & Adrian, LLP

(57) ABSTRACT

Disclosed herein is a focusing screen master having a microlens array formed all over a flat substrate surface, the microlens array being constructed by arranging a plurality of types of microlenses that are different from each other in height, radius of curvature and surface configuration.

20 Claims, 9 Drawing Sheets

CENTER

PERIPHERY

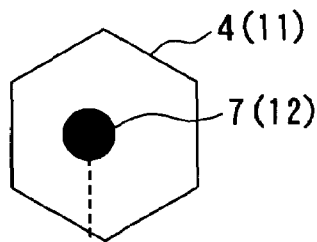
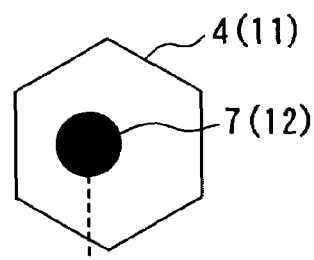
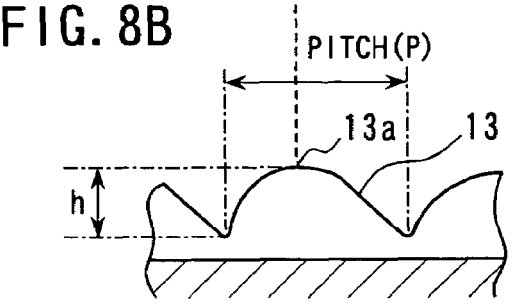
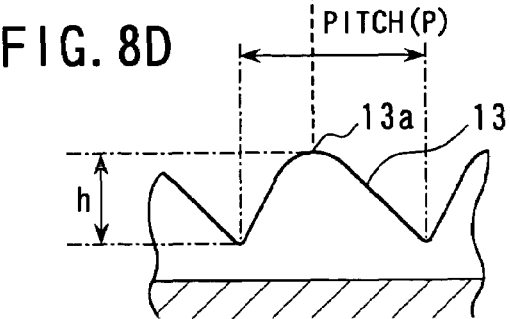
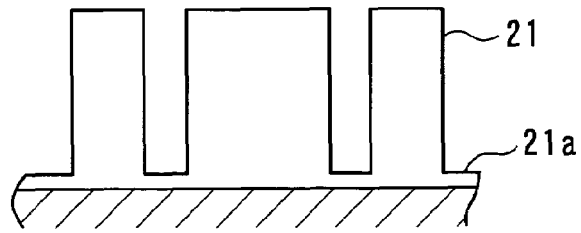
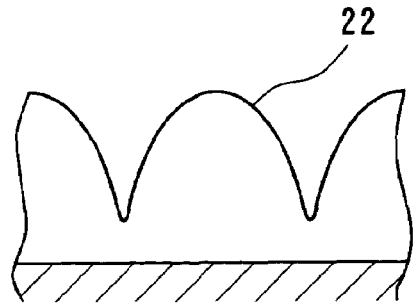

CENTER

PERIPHERY

FOCUSING SCREEN MASTER AND MANUFACTURING METHOD THEREOF

This application claims benefit of Japanese patent application No. 2,003-386,135 filed in Japan on Nov. 17, 2003, the contents of which are incorporated by this reference.

BACKGROUND OF THE INVENTION

The present invention relates to focusing screen master and manufacturing method thereof for manufacturing focusing screens to be used in camera or the like.

Focusing screens to be used in camera or the like are generally fabricated as follows. Specifically, a focusing screen master having a microlens array formed thereon is first used as a master block to fabricate a metal mold or a concave metal mold is fabricated by transferring a form further from the master block. These metal molds are then used in fabrication of the focusing screen by resin forming. A focusing screen having such microlens array formed thereon is capable of being controlled in disposing pitch between microlenses and microlens height so as to control a required blur level and brightness and is used as the focusing screen in a camera.

As a generally used manufacturing method of microlenses on a focusing screen master, Japanese Patent Application Laid-Open Hei-6-194502 for example discloses the so-called "thermal distortion method" in which a photosensitive material uniformly formed on a substrate is exposed to a lens pattern, developed, and then thermally distorted. A description will now be given by way of FIGS. 1A to 1E with respect to the manufacturing method of microlenses disclosed in the above mentioned publication. First, as shown in FIG. 1A, a photosensitive material 101 capable of thermal distortion is formed into a film having a uniform thickness on a flat substrate 102. Subsequently, as shown in FIG. 1B, the photosensitive material 101 is exposed to light of a microlens array pattern 104 depicted on a quartz photomask 103 (optical patterning 105). As shown in FIG. 1C, then, after developing it to form a rectangular photosensitive material 101a, the rectangular photosensitive material 101a is heated to a temperature above its thermal distortion temperature. Convex lenses 101b having identical configuration are thereby obtained uniformly all over the substrate surface as shown in FIG. 1D.

Subsequently, the substrate side having a microlens array formed thereon where these convex lenses 101b are arranged in an array is subjected to dry etching to transfer the form thereof onto the substrate 102 as shown in FIG. 1E. In this manner, a focusing screen master 106 having microlenses formed thereon is completed.

SUMMARY OF THE INVENTION

It is an object of the invention to provide a focusing screen master and manufacturing method thereof which is improved in characteristics, capable of favorably obtaining both the focusing performance and optical system's brightness as a focusing screen at the same time, and is easy to manufacture.

In a first aspect of the invention, there is provided a focusing screen master having a microlens array formed all over a flat substrate surface. The microlens array is constructed by arranging a plurality of types of microlenses that are different from each other in height, radius of curvature and surface configuration.

In a second aspect of the invention, the microlens array in the focusing screen master according to the first aspect is constructed by arranging the plurality of types of microlenses respectively at fixed rates.

In a third aspect of the invention, the microlens array in the focusing screen master according to the first aspect is constructed by arranging the plurality of types of microlenses respectively at arbitrary rates.

In a fourth aspect of the invention, the microlens array in the focusing screen master according to the second or third aspect is constructed by randomly arranging the plurality of types of microlenses.

In a fifth aspect of the invention, the microlenses in the focusing screen master according to any one of the first to fourth aspects have a cross-sectional configuration that is symmetrical cross-sectional configuration.

In a sixth aspect of the invention, the microlenses in the focusing screen master according to any one of the first to fourth aspects have a cross-sectional configuration that is asymmetrical cross-sectional configuration.

In a seventh aspect of the invention, the microlenses in the focusing screen master according to any one of the first to fourth aspects are arranged in a mixture of those having symmetrical cross-sectional configuration and those having asymmetrical cross-sectional configuration.

In an eighth aspect of the invention, the microlens array in the focusing screen master according to any one of the first to seventh aspects is without a gap between the microlenses and the microlenses are connected to each other so as to cross each other at an acute angle at their joint surface.

In a ninth aspect of the invention, there is provided a manufacturing method of the focusing screen master according to any one of the first to eighth aspects, including the step of forming microlenses with using a multistage exposure process for continuously effecting a multistage exposure using a plurality of pieces of photomask.

In a tenth aspect of the invention, the multistage exposure process in the manufacturing method of the focusing screen master according to the ninth aspect is effected in such a manner that an interior part of a microlens forming region of a first photomask is overlapped by microlens forming regions of and after a second photomask that are gradually reduced in size.

In an eleventh aspect of the invention, the microlens forming regions of and after the second photomask in the manufacturing method of the focusing screen master according to the tenth aspect are concentric with the microlens forming region of the first photomask.

In a twelfth aspect of the invention, the microlens forming regions of and after the second photomask in the manufacturing method of the focusing screen master according to the tenth aspect are not concentric with the microlens forming region of the first photomask.

In a thirteenth aspect of the invention, each exposure step of the multistage exposure process of the manufacturing method of focusing screen master according to any one of the ninth to twelfth aspects is an exposure step in underexposure level so as to leave a remaining photoresist in the region where microlens is not formed.

BRIEF DESCRIPTION OF THE DRAWINGS

FIGS. 8A to 8D illustrate peak locations of microlens.

FIGS. 9A and 9B illustrate a resist film and microlens configuration.

DESCRIPTION OF THE PREFERRED EMBODIMENTS

Figure 1A:
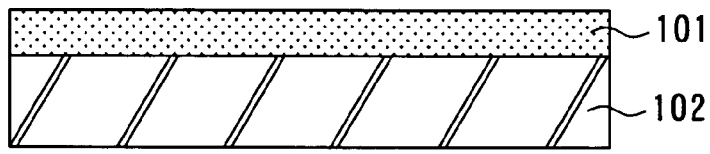
FIGS. 1A to 1E illustrate manufacturing process of the conventional focusing screen master.
Figure 1B:
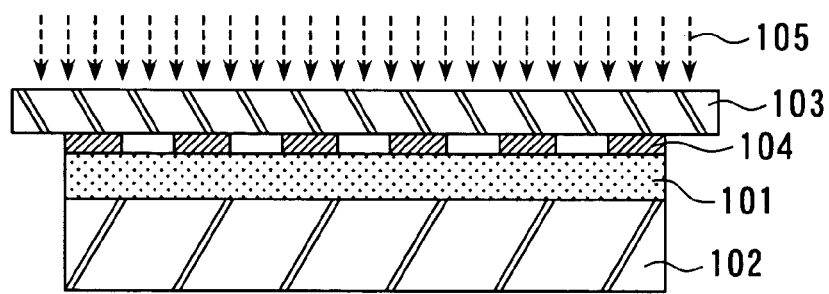
Figure 1C:
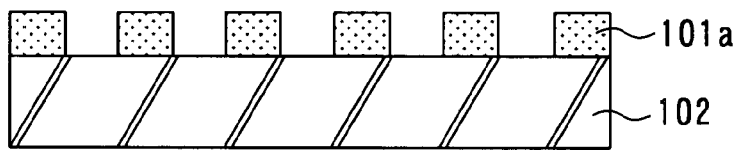
Figure 1D:
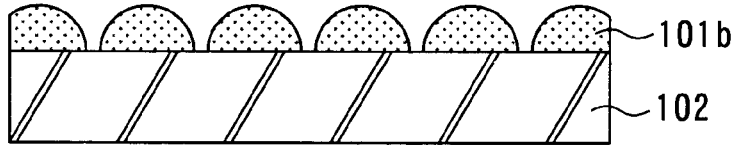
Figure 1E:
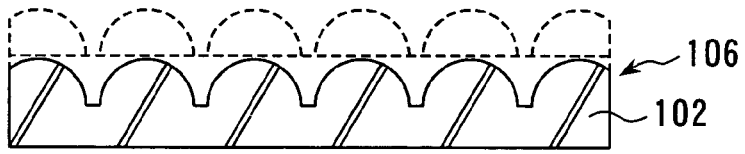
Figure 2A:
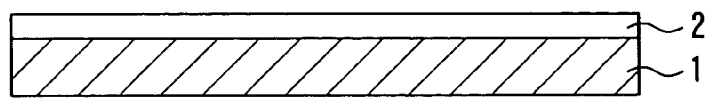
FIGS. 2A to 2E illustrate the manufacturing process of a first embodiment of the focusing screen master according to the invention.

Some embodiments will be described in the following. A first embodiment of the invention will now be described. FIGS. 2A to 2E show manufacturing process to explain a manufacturing method of the focusing screen master according to the present embodiment. First, as shown in FIG. 2A, photoresist of a photosensitive material that can be thermally distorted is uniformly applied by means of spin method on a silicon (Si) substrate 1 to form a photoresist film 2. Here a positive-type photoresist is used as the photoresist. Next, pre-bake is effected to force the remaining solvent and water out from the photoresist film 2 so as to make finer the photoresist film 2.

Figure 2B:
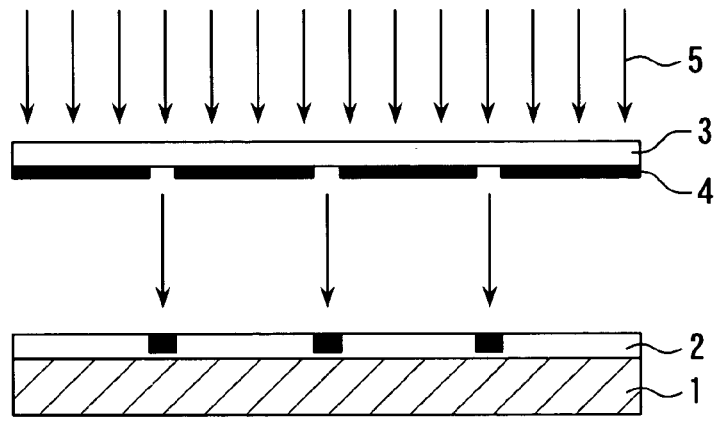

Next, a multistage exposure is effected with using two pieces of photomask. Here it is supposed that a register mark for the multistage exposure is previously formed on the Si substrate 1. First, as shown in FIG. 2B, an exposure 5 is effected with using a first photomask 3 having a first lens pattern 4. The first lens pattern 4 for determining pitch and arrangement of microlenses is thereby patterned on the photoresist film 2. Subsequently, an exposure 5 is effected with using a second photomask 6 having a second lens pattern 7. The second lens pattern 7 for determining height, radius of curvature and configuration of the microlenses is thereby patterned on the photoresist film 2.

Figure 3:
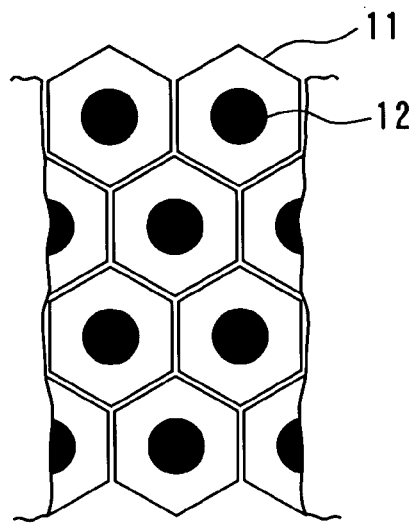
FIG. 3 typically shows a lens pattern of microlenses in the first embodiment of the invention.

Here, the first lens pattern 4 by the first photomask 3 is in the form of a honeycomb as shown in FIG. 3 where regular hexagons are densely arranged. The second lens pattern 7 by the second photomask 6, on the other hand is circular. Referring to FIG. 3, numerals 11 and 12 indicate the form as seen from top of the first lens pattern 4 and second lens pattern 7, respectively. The second lens pattern 7(12) by the second photomask 6 is such a pattern capable of shutting out a portion of the honeycomb pattern region of the first lens pattern 4(11) from light at the time of the second exposure. The height and radius of curvature of microlens then can be controlled by varying the size of the second lens pattern 7(12). Further, the peak location of microlens is changed and the configuration of microlens can be controlled by changing location of the second lens pattern 7(12). Accordingly, various microlenses can be formed by controlling at will the size and location of the second lens pattern 7(12).

Figure 4A:
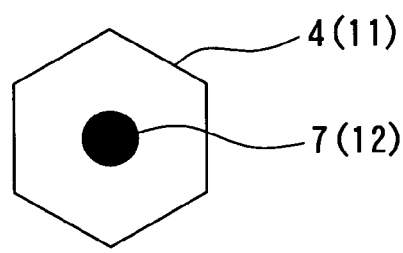
FIGS. 4A and 4B illustrate an example of the lens pattern and microlens configuration.
Figure 4B:
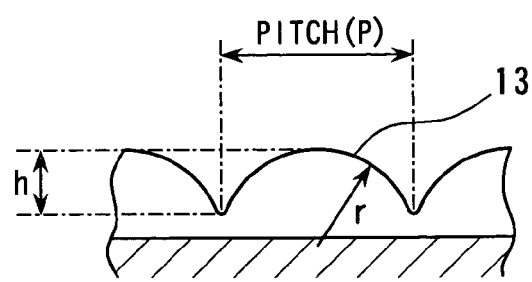
Figure 6:
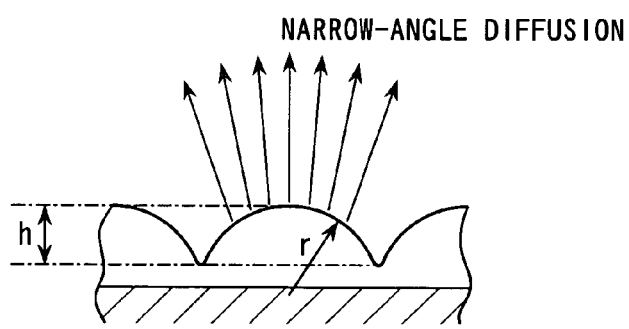
FIG. 6 illustrates diffused light by a microlens configuration.

A detailed description will now be given with respect to the controlling method such as of the configuration and size of microlens. The pitch and arrangement of the microlenses are determined by the first lens pattern 4(11), and the height and radius of curvature of the microlenses on the other hand are determined by the second lens pattern 7(12). When the second lens pattern 7(12), i.e., the shielded portion is reduced in size as shown in FIG. 4A, height h of microlens 13 becomes lower and radius of curvature r becomes greater as shown in FIG. 4B. At this time, as shown in FIG. 6, a narrow-angle diffused light diffused into a narrow angle is caused. In this case, the effect of refraction is smaller so that, though a brighter optical system where a greater amount of light goes straight is obtained, the focusing performance thereof becomes lower.

Figure 5A:
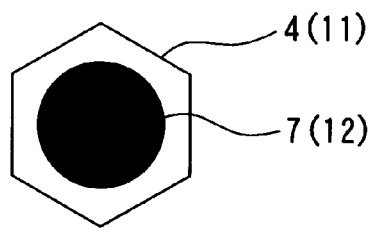
FIGS. 5A and 5B illustrate another example of the lens pattern and microlens configuration.
Figure 5B:
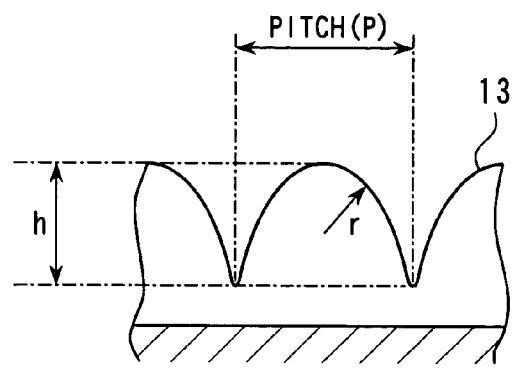
Figure 7:
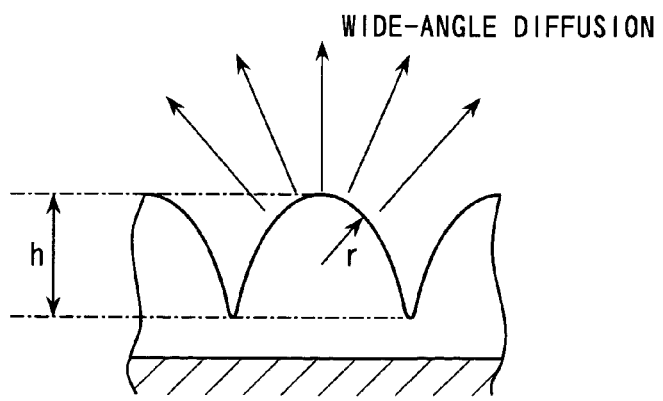
FIG. 7 illustrates diffused light by another microlens configuration.

When the second lens pattern 7(12) is made larger as shown in FIG. 5A, height h of the microlens 13 becomes higher and radius of curvature r becomes smaller as shown in FIG. 5B. At this time, as shown in FIG. 7, a wide-angle diffused light diffused into a wide angle is caused. In this case, the effect of refraction on the microlens surface is greater so that, though focusing performance (diffusion characteristic) is higher, the amount of light transmitted through a center portion of the microlens becomes less and it results in a darker optical system. It should be noted that, since the location of center of the second lens pattern 7(12) in the case of microlens shown in FIGS. 4B and 5B is the same as the location of center of the first lens pattern 4(11), a microlens having a symmetrical cross-sectional configuration is obtained.

On the other hand, as shown in FIGS. 8A to 8D, a peak location 13a of the microlens 13 can be shifted from the location of its center by shifting the center of the second lens pattern 7(12) from the center of the first lens pattern 4(11). In this case, a microlens having asymmetrical cross-sectional configuration is obtained. At this time, by randomly determining not only the amount to be shifted but also the direction to be shifted in shifting the position of the second lens pattern 7(12), the distance between the peak locations of each microlens also departs from a fixed value and becomes random. It is thereby possible to obtain microlenses having various asymmetrical characteristics.

Accordingly, microlenses having various configuration can be formed at will by suitably combining the size and center location of the second lens pattern 7(12). FIGS. 4A, 5A, 8A, and 8C show the top view forms 11, 12 of the first and second lens patterns 4, 7, and FIGS. 4B, 5B, 8B, 8D show the configurations of the microlens 13 formed therefrom.

Figure 2C:
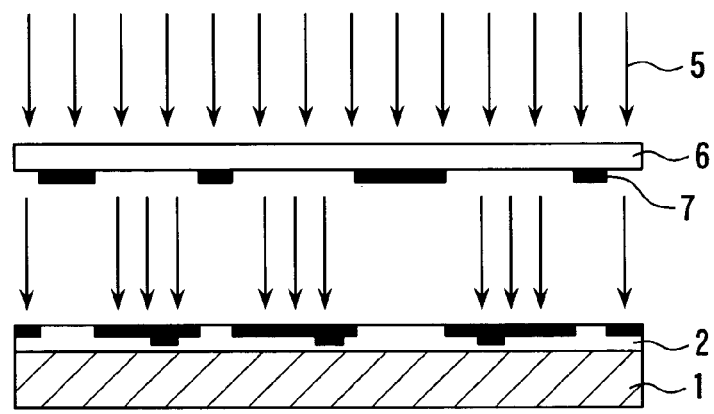

It is important that the exposure stage using the first photomask 3 and second photomask 6 shown in FIGS. 2B, 2C is effected so that it becomes an underexposure. In other words, an underexposure is required so that a resist film without reaction be left at the time of the exposure where the remaining resist film thickness after development is desirably 5 to 20%.

The manner of such underexposure will be described in further detail with reference to FIG. 9A. Here, after developing an underexposure, a desired lens height is obtained by causing a remaining resist 21a to be left in the region of resist film 21 where microlens is not formed. This is because the depth of a gap portion of microlens can be changed by changing the film thickness of the remaining resist 21a by an exposure amount to the underexposure region which becomes the gap portion. In other words, since a microlens having a lower height is formed when the depth of gap is shallow, microlens 22 having a desired height can be obtained by suitably selecting an exposure amount at the underexposure region. Further, as will be described later, since heating treatment can be effected with spending a relatively longer time at a lower temperature, it is also possible to optimize the connected condition between each microlens.

Figure 2D:
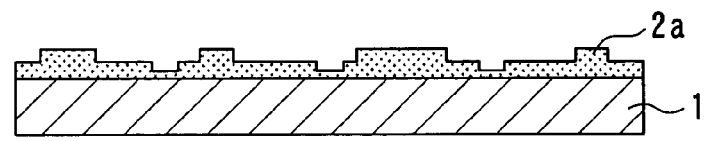

A description will now be given again with respect to the manufacturing process shown in FIGS. 2A to 2E. Next to the exposure step using the first and second photomasks 3, 6 shown in FIGS. 2B, 2C, development and rinse processing are effected as shown in FIG. 2D to form resist film 2a in the form having multiple steps. While, usually, developer and rinsing liquid left within the resist film 2a are removed after the development and rinse processing and a post-bake for improving adhesion of resist film 2a is to be effected, the post-bake in this case is not effected so as not to lower the flowability of the resist film in the heat treatment process to be described in the following.

Next, a heat treatment is effected in an oven of $N_2$ gas atmosphere. This heat treatment is effected at a heat treatment temperature higher than the softening point of the resist, and the heating time is previously determined to an optimum level from the lens configuration. By this heat treatment, the resist film 2a having a multiple-step configuration is deformed so that microlens 2b is formed.

Figure 10A:
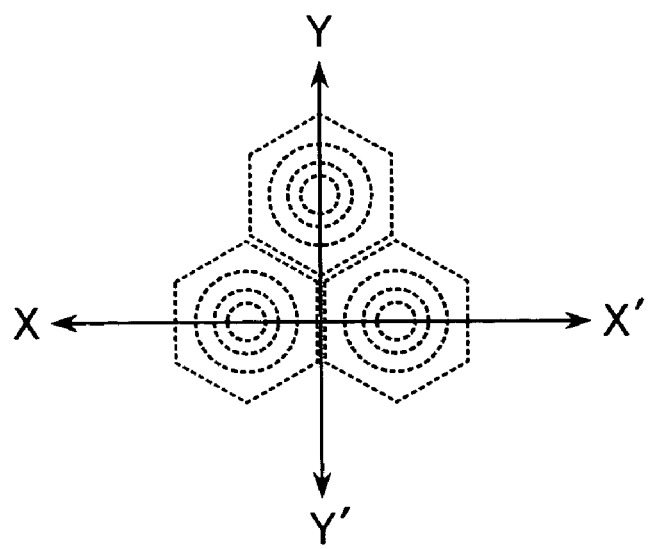
FIGS. 10A, 10B, and 10C illustrate connected condition of microlenses.
Figure 10B:
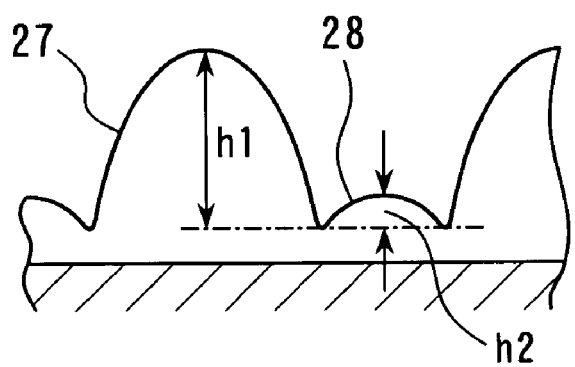
Figure 10C:
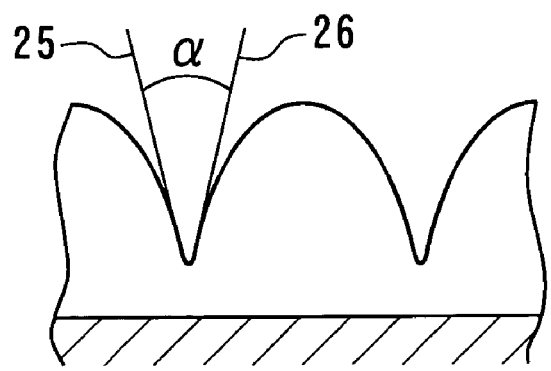

At this time, each individual microlens is in its connected condition as shown in FIG. 9B. The microlenses are thus brought into an optimum configuration and the characteristic defect at their connecting portion is eliminated. The connected condition of the microlenses will now be described in detail with reference to FIGS. 10A to 10C. FIG. 10A typically shows a top view of microlens array consisting of the connected microlenses; and FIGS. 10B and 10C show cross-sectional configurations representing desired connected condition of the microlenses in a longitudinal section along line Y–Y' and in a cross section along line X–X', respectively, of FIG. 10A. In the cross section shown in FIG. 10C, the connected condition is such that angle α between two tangent planes 25, 26 of the microlenses that are next to each other is an acute angle greater than 20°. In the longitudinal section shown in FIG. 10B, on the other hand, while a connecting portion 28 in the form of a circular arc is formed, height h2 of the connecting portion 28 is desirably 20% at most of height h1 of microlens 27 to be connected.

Figure 2E:
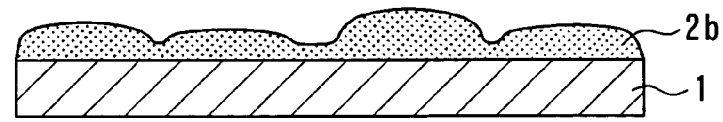

In this manner, the connected condition of the microlenses is brought into an optimized configuration so that various characteristic defects at the connecting portion are eliminated. When the lens configuration is formed by heat treatment as the above, it is subjected to cooling and caking. By the above processing steps, a microlens array of the microlens pattern as shown in FIG. 2E is formed. Here, while the configuration of each individual microlens has an irregular form where all of height, radius of curvature and lens peak location are different, the microlens array having such microlens pattern becomes the focusing screen master made of resist obtained by a multistage exposure method.

Subsequently, in order to obtain an actual plastic focusing screen, a conductive film consisting of chromium film and gold film is formed for example by vacuum evaporation on such focusing screen master made of resist. In particular, after forming a chromium film for example by resistance heating, a gold film is formed. Dipping into a plating bath of nickel/nickel chloride is then effected to form a concave electroforming nickel layer. This is used as a stamper for injection molding of such resins as polycarbonate, polymethylmethacrylate, cyclic polyolefin resin, polystyrene, CR-35or TPX to fabricate a convex-type plastic focusing screen. Thus fabricated focusing screen is finally combined into an imaging optical system of camera.

With the focusing screen master having microlens configuration fabricated as the above, a focusing screen favorably providing both focusing performance and brightness that are the reciprocal characteristics to each other can be readily manufactured, and each individual microlens can be easily controlled in size, configuration, etc.

The present embodiment has been described of but is not limited to the case of using two pieces of photomask for the multistage exposure when the microlens are formed, and it is also possible to effect the multistage exposure with using three or more pieces of photomask. In such a case, it suffices to effect an exposure with adding additional photomask to the two pieces of photomask described in the present embodiment. At this time, the lens pattern of and after the third photomask is such a lens pattern that it is located within the lens pattern directly previous to it. The use of three or more photomasks in this manner in effecting the multistage exposure makes it possible to form desired microlenses where height and size or configuration are more variously changed.

Figure 11A:
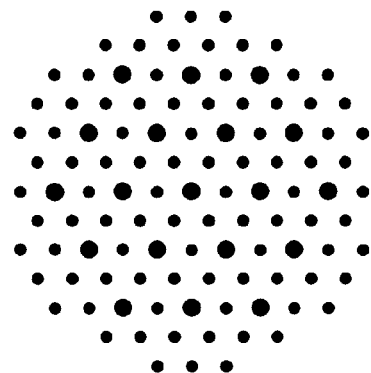
FIGS. 11A to 11D illustrate diffused light and reflected diffusion pattern by each microlens type.
Figure 11B:
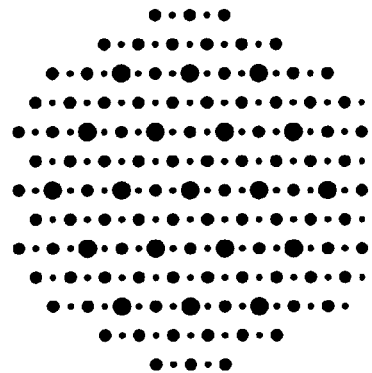
Figure 11C:
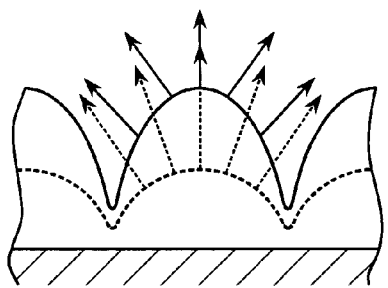
Figure 11D:
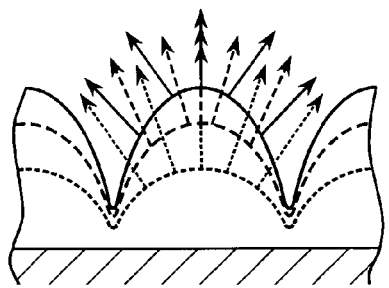

A second embodiment of the invention will now be described. This embodiment relates to a focusing screen master where disposition and arranging manner of microlenses are varied. First, a description will be given with respect to focusing screen master in the case where microlenses of various sizes and configurations are mixed. FIGS. 11A to 11D show top views typically of the cases where two types and three types of microlenses having different lens height are mixed, and the manner of diffused light and reflected diffusion pattern of the focusing screen fabricated by such focusing screen master. First, in the case of construction by two types of microlenses as shown in FIG. 11A, a wide-angle diffused light diffused into a wide angle is caused at the microlenses having higher lens height, and a narrow-angle diffused light diffused into a narrow angle is caused at the microlens having lower lens height as shown in FIG. 11C. In the case of construction by three types of microlenses as shown in FIG. 11B, on the other hand, light diffused into an intermediate angle is added as shown in FIG. 11D to the wide-angle diffused light and narrow-angle diffused light.

When the types of lens heights are increased in this manner, there is an increase in diffused light that is diffused into different angles. Accordingly, if the lens height is varied without step, light is diffused into all angles. It is thereby possible to observe a natural light. In other words, a more natural depiction is obtained when an object image is seen through a finder. Further, since the radius of curvature is correspondingly varied due to the difference in lens height, the light coming in from various angles is diffused by various refraction surfaces. It is thereby possible to form an image of the object more faithfully and clearly. In other words, an improved acquisition ability of object captured by camera can be achieved.

On the other hand, as shown in FIGS. 11C and 11D, it is seen from reflection diffusion pattern that the number of bright spots in the reflection diffusion pattern is increased with the increase in the number of types of lens height. Here, the reflection diffusion pattern refers to bright spot pattern of reflected light rays from the focusing screen when a laser beam is irradiated on the focusing screen, and signifies a natural blur condition when the number of such bright spots is greater. Accordingly, a natural and favorable blur condition can be obtained with the increase in the types of lens height.

Figure 12A:
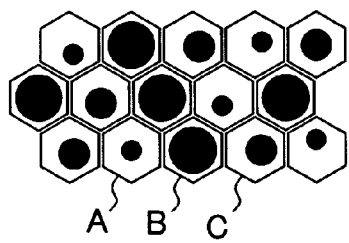
FIGS. 12A and 12B illustrate a focusing screen master according to a second embodiment of the invention.
Figure 12B:
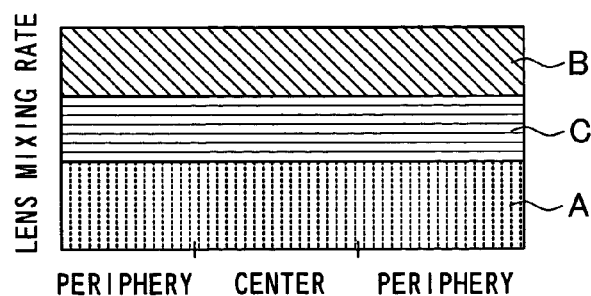

In this manner, it is possible to achieve desired focusing screens having different characteristics by mixing various microlenses. A description will now be given with respect to focusing screen master for fabricating a focusing screen by which a natural depiction with considering the above various characteristics is obtained. Referring to the focusing screen master shown in FIG. 12A: A denotes a microlens having greater radius of curvature and lower lens height; B denotes a microlens having smaller radius of curvature and greater lens height; and C denotes a microlens having a radius of curvature and lens height that are intermediate between A and B. The mixing ratio of the three types of microlenses A, B, and C is fixed all over the entire focusing screen master as shown in FIG. 12B. In other words, the three types of microlenses are provided at certain rates without regard to a center portion or peripheral portion of the focusing screen master. Here, the focusing performance of a focusing screen fabricated by this focusing screen master is determined by microlens B and brightness is determined by microlenses A and C.

In this manner, a focusing screen capable of satisfying both the focusing performance and brightness at the same time can be formed by mixing a plurality of microlenses that are different in radius of curvature and lens height. Especially, as shown in the present embodiment, a focusing screen providing natural depiction that is bright and easy to focus can be achieved by disposing a plurality of types of optimized microlenses at fixed rates all over the focusing screen surface.

The present embodiment has been shown as but not limited to one using three types of microlenses, and it is naturally also possible to use a plurality of types microlenses having arbitrary configuration. In ideal, it is preferable to dispose microlenses having lens heights that are varied without step. Further, it is convenient to previously optimize such configurations as radius of curvature and lens height of the microlenses according to the lens of the optical system to be used. Furthermore, cross-sectional configuration of the microlenses may be symmetrical or asymmetrical or be a mixture of symmetrical and asymmetrical configurations.

A third embodiment of the invention will now be described. This embodiment relates to focusing screen master where disposition and arranging manner of the microlenses are further varied. While a description has been given in the above second embodiment with respect to the disposition of microlenses with giving emphasis to natural depiction, the present embodiment will be described with respect to one where consideration in disposing microlenses is to keep brightness at peripheral portions.

Figure 13A:
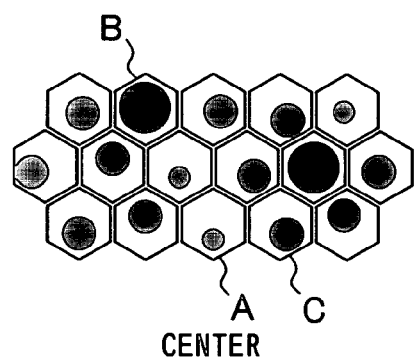
FIGS. 13A, 13B and 13C illustrate a focusing screen master according to a third embodiment of the invention.
Figure 13B:
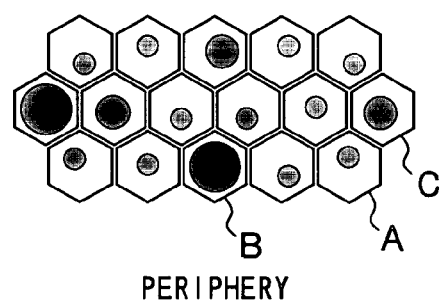
Figure 13C:
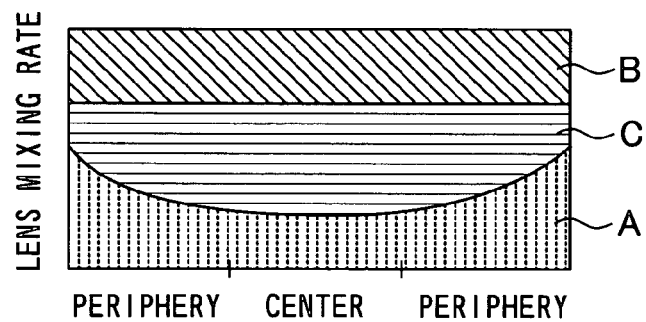

FIGS. 13A and 13B are top views typically showing a center portion and a peripheral portion, respectively, of the focusing screen master according to the third embodiment. Referring to FIGS. 13A and 13B: A denotes a microlens having greater radius of curvature and lower lens height; B denotes a microlens having smaller radius of curvature and greater lens height; and C denotes a microlens having a radius of curvature and lens height that are intermediate between A and B. As can be seen from FIG. 13C for indicating the lens mixing rates, microlens B occurs at a fixed rate all over the entire focusing screen surface, and microlens C occurs at higher mixing rate at a center portion of the focusing screen and at lower rate toward peripheral portions. Microlens A, on the other hand, occurs at rates opposite to those of microlens C. Here, while the focusing performance of the focusing screen fabricated by this focusing screen master is determined by microlens B and brightness is determined by microlens A and microlens C, the rate of microlens A is higher toward the peripheral portions. Microlens A is the microlens having greater radius of curvature and lower lens height and is the brightest microlens among the three types of microlenses.

The rate of the brightest microlens is thus higher toward the peripheral portions. Thereby, while the peripheral portions are generally darker due to reduced light amount, it is possible to achieve a brighter focusing screen without a reduction in peripheral light amount. Here, the rates of the three types of microlenses can naturally be arranged to any rates as far as the peripheral portions can be made brighter.

The present embodiment has been shown as but not limited to one using three types of microlenses, and it is naturally also possible to use a plurality of types of microlenses having arbitrary configuration. In ideal, it is preferable to dispose microlenses having lens heights that are varied without step. Further, it is convenient to previously optimize such configurations as radius of curvature and lens height of the microlenses according to the lens of the optical system to be used. Furthermore, cross-sectional configuration of the microlenses may be symmetrical or asymmetrical or be a mixture of symmetrical and asymmetrical configurations.

The above second and third embodiments have been described with respect to arrangement of microlenses applicable to focusing screen master for fabricating a focusing screen capable of natural depiction and a focusing screen bright at peripheral portions, respectively. The invention however is not limited to these and focusing screen having desired characteristics can be achieved by selecting size and configuration of microlenses at will and by arranging a plurality of types of microlenses different for example in size and configuration at suitable rates.

Figure 14:
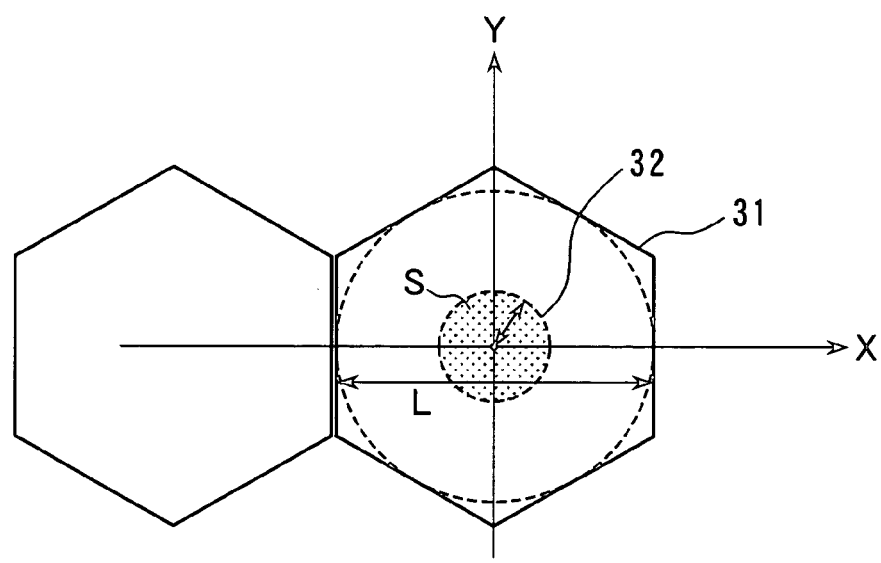
FIG. 14 illustrates a disposition of microlens in the focusing screen master according to a fourth embodiment of the invention.

A fourth embodiment of the invention will now be described. The present embodiment relates to focusing screen master where microlenses having symmetrical or asymmetrical cross-sectional configuration are randomly disposed. First, the technique for randomly disposing microlenses having a symmetrical cross section will be described. The forming of symmetrical configuration microlens, as previously described, is determined by the disposition of the second lens pattern within the first lens pattern, and the second lens pattern is required to have a common center with the first lens pattern. In other words, the second lens pattern suffices to be a concentric circle having the common center within the circle inscribed in the first lens pattern. Such a manner is shown in FIG. 14.

Here, when the size (the pitch between lenses) of first lens pattern 31 is supposed as L, the extent of second lens pattern 32, i.e., light-shielded area S is expressed by the following formula using a random function. Here RAND( ) is a random number of 0 to 1.

$$S=(\pi L^2)/4 \times \text{RAND}(\ )$$

It is thus possible to set the lens height without step by using random numbers. It should be noted that the rate of the generated lens height becomes a fixed rate throughout all portions of the focusing screen.

Next, the method of forming microlenses having asymmetrical cross-sectional configuration can be achieved by shifting the center location of second lens pattern from the center location of first lens pattern as has been described in the first embodiment. In an ideal focusing screen master, a higher degree of randomness of the disposition of the second lens pattern within the first lens pattern is desirable.

Figure 15:
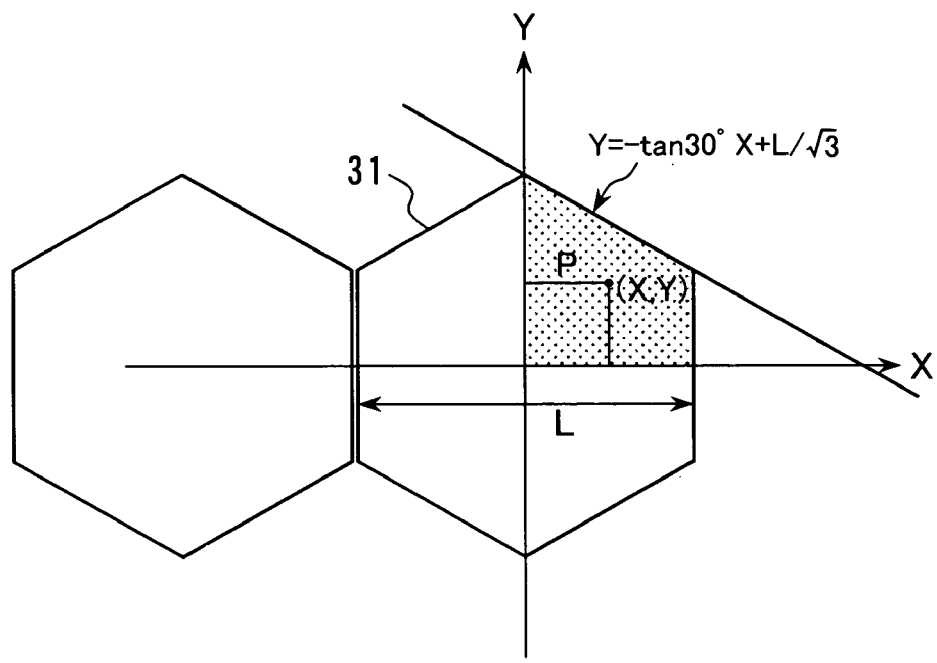
FIG. 15 illustrates another disposition of microlens in the focusing screen master according to the fourth embodiment of the invention.

Here, the technique for randomly disposing second lens pattern can be readily set as will be shown below by combining a rounded up function and random function. In particular, first as shown in FIG. 15, the case where the center location P of the second lens pattern is located within the first quadrant of the first lens pattern 31 is considered. Provided that RAND ( ) is a function that independently generates random numbers of 0 to 1. Supposing L as the pitch between lenses at this time, coordinates P(X,Y) of the center location P of the second lens pattern are expressed by the following formula in the region $$\{(X, Y), 0 \leq Y \leq -\tan 30 X + L/\sqrt{3}, 0 \leq X < L/2\}.$$

X=RAND( )×2/L

Y=RAND( )×L/√3

Figure 16:
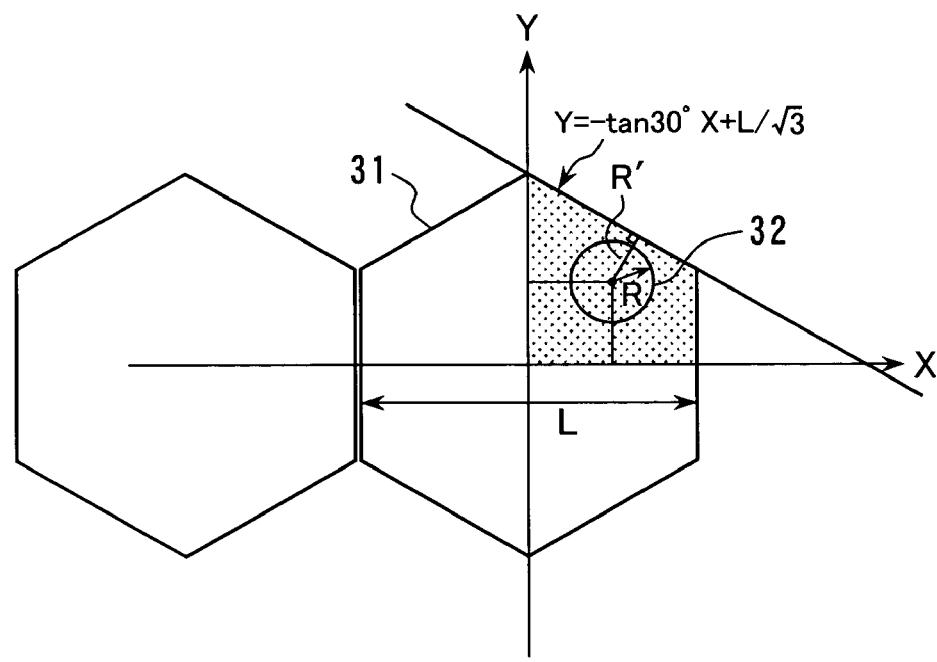
FIG. 16 illustrates yet another disposition of microlens in the focusing screen master according to the fourth embodiment of the invention.

Further, it is also possible to combine the random positioning with the extent (light-shielded area: S) of the second lens pattern. Such a manner is shown in FIG. 16. Referring to FIG. 16, peak location and extent of the second lens pattern 32 within the first lens pattern 31 can be randomly generated as follows. In particular, it suffices that, in relation to straight line: Y=−tan 30°+L/√3 forming one side of the first lens pattern 31, i.e., the honeycomb pattern, radius R of a circle having lens peak location (center location) P is randomly generated within vertical distance R' to the straight line. In other words, the relationship between R and R' is expressed as in the following formula.

$$\text{In } R' \leq |(\tan 30°) X + Y + L/\sqrt{3}|/\sqrt{[1+(\tan 30°)^2]},$$

R=RAND( )×R'

S=πR²

When microlenses are disposed all over the entire focusing screen master using such methods, focusing screen is provided with a "suitable irregularity" so that not only elimination of mottled coloring but also improved abilities for acquiring and depicting an object are achieved whereby a focusing screen that provides more natural blur taste can be fabricated.

As has been described by way of the above embodiments, with the construction of the first aspect, the focusing screen master can be achieved as capable of forming a focusing screen of which both focusing performance and brightness can be improved. With the above second to seventh aspects of the invention, it is possible to readily achieve a focusing screen master having a desired characteristic by providing various types of arrangement and cross-sectional configuration of the microlenses. With the above eighth aspect of the invention, the connected condition of the microlenses to each other can be accurately controlled.

With the manufacturing method of focusing screen master according to the ninth to twelfth aspects of the invention, a multistage exposure using a plurality of pieces of photomask is effected so that a focusing screen master capable of favorably achieving both the characteristics of focusing performance and brightness at the same time can be readily manufactured and microlenses of various configuration can be readily manufactured. With the manufacturing method of focusing screen master according to the thirteenth aspect of the invention, it is possible to obtain microlenses having desired heights and to optimize the connected condition between individual microlenses.

What is claimed is:

1. A focusing screen master comprising a microlens array formed all over a flat substrate surface, wherein said microlens array comprises an arrangement of a plurality of types of microlenses that are different from each other in height, radius of curvature and surface configuration.

2. The focusing screen master according to claim 1, wherein said microlens array comprises said plurality of types of microlenses arranged respectively at fixed rates.

3. The focusing screen master according to claim 2, wherein said microlens array comprises said plurality of types of microlenses that are randomly arranged.

4. The focusing screen master according to claim 2, wherein said microlenses have a cross-sectional configuration that is symmetrical cross-sectional configuration.

5. The focusing screen master according to claim 2, wherein said microlenses have a cross-sectional configuration that is asymmetrical cross-sectional configuration.

6. The focusing screen master according to claim 2, wherein said microlenses are arranged in a mixture of those having symmetrical cross-sectional configuration and those having asymmetrical cross-sectional configuration.

7. The focusing screen master according to claim 1, wherein said microlens array comprises said plurality of types of microlenses arranged respectively at arbitrary rates.

8. The focusing screen master according to claim 7, wherein said microlens array comprises said plurality of types of microlenses that are randomly arranged.

9. The focusing screen master according to claim 1, wherein said microlenses have a cross-sectional configuration that is symmetrical cross-sectional configuration.

10. The focusing screen master according to claim 7, wherein said microlenses have a cross-sectional configuration that is symmetrical cross-sectional configuration.

11. The focusing screen master according to claim 1, wherein said microlenses have a cross-sectional configuration that is asymmetrical cross-sectional configuration.

12. The focusing screen master according to claim 7, wherein said microlenses have a cross-sectional configuration that is asymmetrical cross-sectional configuration.

13. The focusing screen master according to claim 1, wherein said microlenses are arranged in a mixture of those having symmetrical cross-sectional configuration and those having asymmetrical cross-sectional configuration.

14. The focusing screen master according to claim 7, wherein said microlenses are arranged in a mixture of those having symmetrical cross-sectional configuration and those having asymmetrical cross-sectional configuration.

15. The focusing screen master according to claim 1, wherein said microlens array is without a gap between the microlenses and the microlenses are connected to each other so as to cross each other at an acute angle at their joint surface.

16. A method of manufacturing the focusing screen master claimed in claim 1, said manufacturing method of the focusing screen master comprising the step of forming microlenses with using a multistage exposure process for continuously effecting a multistage exposure using a plurality of pieces of photomask.

17. The manufacturing method of the focusing screen master according to claim 16, wherein said multistage exposure process is effected in such a manner that an interior part of a microlens forming region of a first photomask is overlapped by microlens forming regions of and after a second photomask that are gradually reduced in size.

18. The manufacturing method of the focusing screen master according to claim 17, wherein said microlens forming regions of and after the second photomask are concentric with the microlens forming region of the first photomask.

19. The manufacturing method of the focusing screen master according to claim 17, wherein said microlens forming regions of and after the second photomask are not concentric with the microlens forming region of the first photomask.

20. The manufacturing method of the focusing screen master according to claim 16, wherein each exposure step of said multistage exposure process is an exposure step in underexposure level so as to leave a remaining photoresist in the region where microlens is not formed.

* * * * *